Sept. 3, 1940.  M. A. WECKERLY  2,213,599
WEIGHING SCALE
Filed Nov. 4, 1932   2 Sheets-Sheet 1
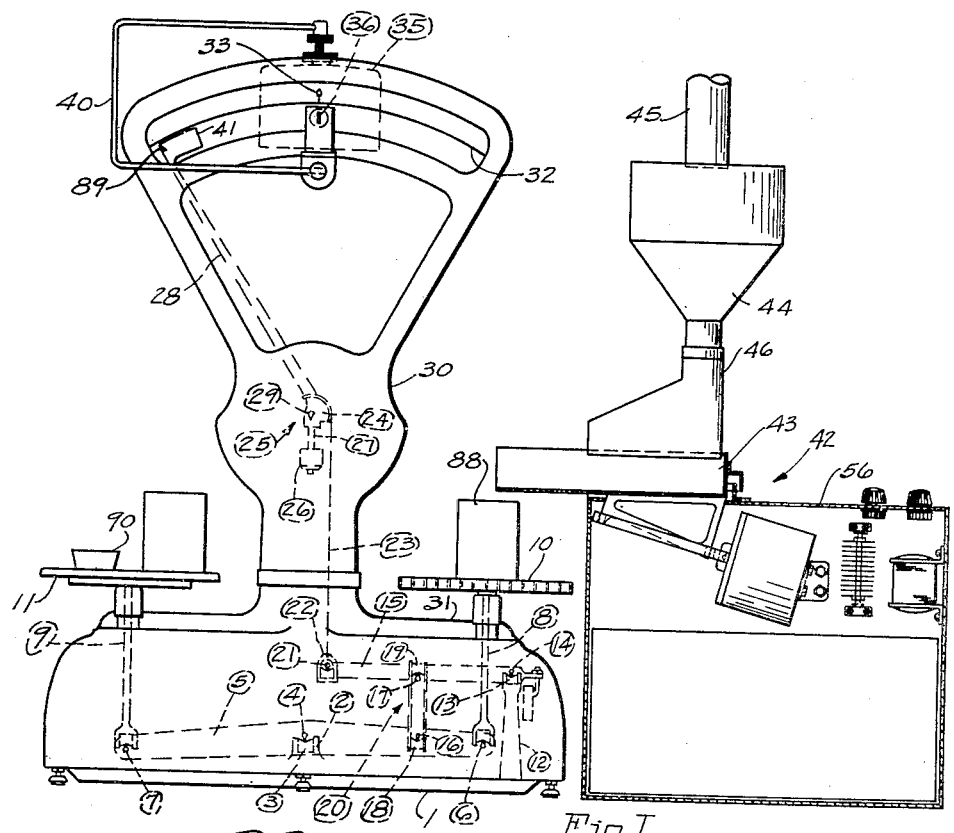
Fig. I
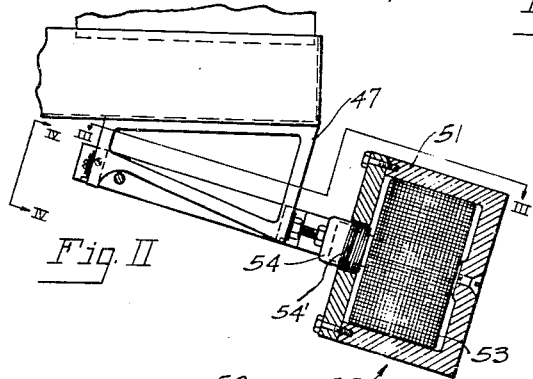
Fig. II
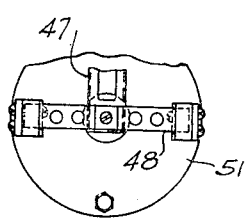
Fig. IV
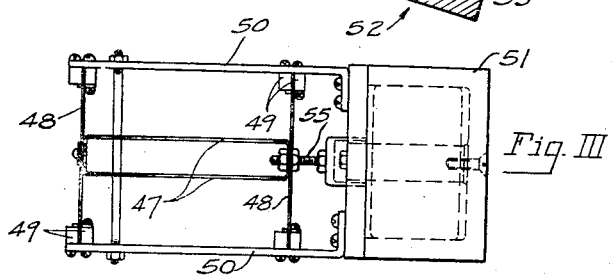
Fig. III
Mark A. Weckerly
INVENTOR
ATTORNEY

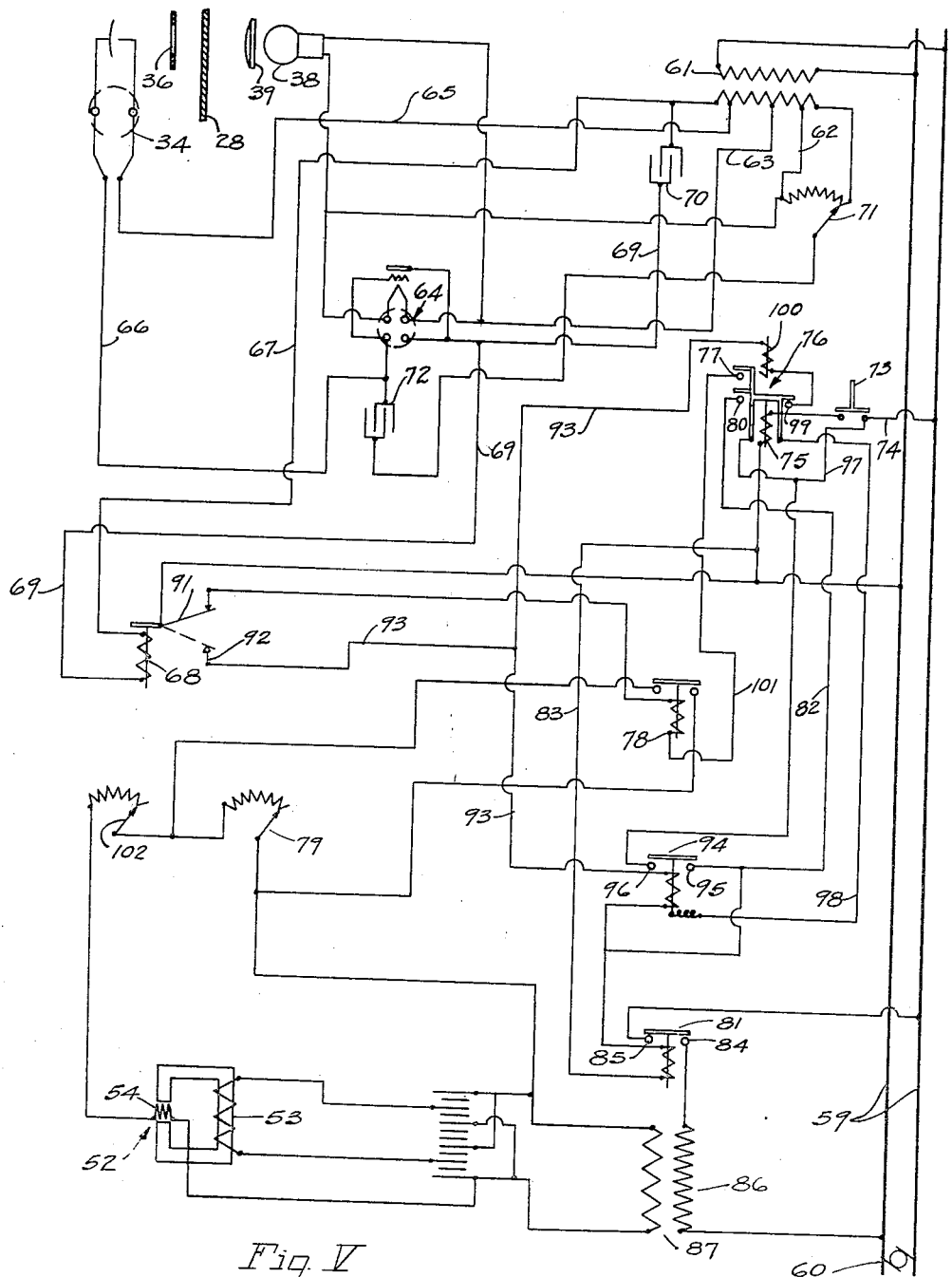
Fig. V

Patented Sept. 3, 1940

2,213,599

UNITED STATES PATENT OFFICE 2,213,599

WEIGHING SCALE

Mark A. Weckerly, Toledo, Ohio, assignor to Toledo Scale Company, Toledo, Ohio, a corporation of New Jersey Application November 4, 1932, Serial No. 641,133

2 Claims. (Cl. 249—62)

This invention relates to weighing scales and in particular to weighing scales which are adapted to determine equal weights of commodities, and its principal object is the provision of a device of this class in which weights are determined by controlling the vibrations of a vibratory feeding device by means of photo-electric controlled means.

Another object is the provision of improved means for controlling a vibratory feeding device.

Another object is a provision of improved means for controlling the vibrations of a vibratory feeding device by means of a photo-electric element.

Still another object is a provision of improved means for changing the amplitude of the vibrations of a vibratory feeding device in response to a load on the weighing scale.

These and other objects will be apparent from the following description illustrating a preferred embodiment of my invention and wherein similar reference numerals refer to similar parts throughout the several views.

Referring to the drawings:

Figure I is a front elevational view showing the combination of a weighing scale and a vibratory feeding device, a part thereof being in section.

Figure II is an enlarged fragmentary side elevational view, a portion being broken away, of the reciprocating motor showing in detail the method of mounting the vibratory feeding trough.

Figure III is a plan view thereof, sectioned substantially along the lines III—III of Figure II.

Figure IV is an end elevational view thereof, parts being broken away, seen substantially from the position shown by lines IV—IV of Figure II; and Figure V is a wiring diagram of the electric circuits.

Since the weighing scale shown in the embodiment of my invention is fully illustrated and described in United States Patent 1,768,478 to H. O. Hem, I will describe it herein only insofar as is necessary to properly disclose my invention.

Projecting upwardly from a base 1, which preferably is a rigid iron casting, are brackets 2 supporting a pair of hardened V bearings 3 which support fulcrum pivots 4 of an even armed lever 5. Fixed in each end of this lever in spaced relation to the fulcrum pivots 4, are a plurality of pivots 6 and 7 which support spiders 8 and 9, respectively, which in turn are surmounted by a load receiver 10 and counterbalance weight receiver 11. The load receiver 10 is preferably in the form of a grid so that material spilled thereon will find no lodgment. A second pair of brackets 12 rises upwardly from the base 1 near one end of the lever 5. Bearings 13 are carried in upper furcations of the brackets 12 and support fulcrum pivots 14 of an auxiliary lever 15. The levers 5 and 15 are equipped with laterally projecting pivots 16 and 17 which engage bearings 18 and 19 of a connecting link 20. The lever 15 is provided with a so-called nose pivot 21 which rests in a stirrup 22 suspended from the lower end of a flexible metallic tape 23, the upper end of which overlies and is fastened to the arcuate surface of a rectifying cam 24 forming a part of a load counterbalancing pendulum 25 which also comprises a pendulum weight 26 adjustably mounted on a stem 27, an indicating hand 28 and a pivot 29 by means of which the load counterbalancing pendulum 25 is fulcrumed upon bearings, not shown, in the interior of a housing 30. The housing 30 is mounted above a base casing 31 covering the lever mechanism mounted on the base. An indicating chart 32 is stationarily mounted in the upper end of this housing and provided with a centrally located zero indicium 33. This chart cooperates with the indicating hand to show the condition of balance in the usual manner.

A photo-electric element 34 enclosed in a light-proof casing 35 is so mounted in relation to the chart that a narrow aperture 36 located in the front wall of the casing 35 is stationed directly beneath the indicium 33. The wall in which the aperture is contained lies substantially in the same plane as the front surface of the chart. To illuminate the photo-electric element 34, a light source, comprising an electric lamp 37, fixed in a housing 38, immediately back of a condensing lens 39, is positioned so that rays of light may shine through the aperture 36 on the photo-electric element 34. The housing 38 containing the lamp is held in this position by a bent rod 40 which is studded into the top of the housing 30. To approximately time the action of the photo-electric relays, the indicator 28 carries on its upper end a flag-like projection or shield 41.

Electrically connected to the weighing mechanism by means of the photo-electric device is a vibratory feeding device 42 comprising a trough 43, which is stationed beneath a pressure equalizing hopper 44, into which the material to be weighed flows through a spout 45 from a supply bin (not shown). A funnel-like member 46 is fastened to the spout of the pressure equalizing hopper 44, and extends into the trough 43 to prevent spillage of the material when it flows into the trough. This trough is mounted on a frame 47 secured between two tightly stretched flexible steel ribbon-like members 48, the ends of which are clamped between bosses 49 projecting inwardly from two arms 50 bolted to the casing 51 of an electric reciprocating motor 52 having a field coil 53 and an armature 54. The field coil 53 is situated within the motor casing 51 and is supplied with direct current setting up a non-reversing field in the casing. An armature 54 having a coil $54^1$ is supplied with alternating current, thus producing a reciprocating motion in synchronism with the alternating current source and varying with the potential applied, thereby imparting vibrations of corresponding amplitude to the frame 47 and the trough 43. The armature is adjustably mounted on a threaded stud 55 which also serves as one of the members to bolt the frame 47 to the rearwardly positioned flexible steel member 48.

The arrangement of trough, motor and flexible members is such that the trough vibrates vertically and longitudinally so that a rapid even flow of the material can be obtained with a trough horizontal or even with its mouth slightly elevated, hence, material which is so nearly fluid that it would flow by gravity from a trough with a downwardly tilted mouth can be effectively handled in my apparatus. The arrangement of trough, motor and flexible members moves the material acted upon by imparting to it rapidly repeated impulses longitudinally of the trough; hence, it may be termed a longitudinal impulse conveyor. Since the conveying apparatus has no parts which acquire momentum tending to continue their movement through more than one-half cycle, the device stops instantly when the alternating current is cut off. Thus, the vibratory means may be termed self-braking.

In the illustrated embodiment this reciprocating motor and associated vibrating trough is mounted within a box-like housing 56 in which the relays, capacity devices, and controlling means for the electrical system are stationed. This construction is suitable for small installations. With installations of higher weighing capacity, it is desirable that the control means be completely separated from the vibration producing mechanism.

Current for the several electrical controlling circuits is supplied to the apparatus from the usual utility circuit 59 fed by a source 60. This power line is connected to one side of a transformer 61. Leads 62 and 63 tapped into the other side of the transformer conduct current at proper voltage to the lamp 38. These leads are also connected to the filament of a thermionic tube 64, while another lead 65 connects the transformer with one side of the photo-electric element 34, the other side being connected by means of a wire 66 to the grid of the thermionic tube 64; hence when the lamp 38 is lighted and light therefrom passing through the aperture 36 illuminates the photo-electric element, its ability to pass current is increased. Current passes from the transformer through the lead 65, the photo-electric element 34 and the wire 66 to the grid of the thermionic tube, thereby varying the relative potentials of the grid and filament. The necessary current is supplied to the plate of the thermionic tube through the connection 67, the actuating coil of the relay 68 and the connection 69; hence, when the photo-electrical element is activated by an increase in its illumination, the current passing through the actuating coil of the relay 68 is increased in amplified degree. In order that the energy of the actuating coil of the relay 68 may be properly sustained, a condenser 70 is interposed in the connection 69 which connects the actuating coil of the relay 68 with the transformer 61. The grid potential of the thermionic tube may be manually adjusted by means of a potentiometer 71 connected through a smoothing condenser 72 to the wire 66 which leads from the photo-electric element to the grid. This potential may be so adjusted that the current passing through the actuating coil of the relay 68 when the photo-electric element is illuminated is sufficient to actuate the relay, but the current passing through the coil when the illumination of the photo-electric element is cut off is insufficient to actuate the relay. The potentiometer adjustment makes it possible to readily compensate for variations in light conditions and in characteristics of photo-electric elements and thermionic tubes.

With a counterbalance 90 of the weight required to offset the weight of a properly filled package on the counterbalance weight platter 11, the potentiometer 71 being properly adjusted, the photo-electric element 34 being illuminated and consequently the relay 68 being in the position indicated in Figure V, operation of the device is started by manually pressing the starter button or switch 73. The starter button completes the circuit from the utility line 59 through a lead 74 and a setting coil 75 of a mechanically latched three-pole electric reset relay 76. When the setting coil 75 is actuated and the circuit completed through the pole 77 and the relay 68, the position in which it is shown in Figure V, the fast feed relay 78 is closed, thereby shunting out a resistance 79, and at the same time through pole 80 energizing the relay 81 through the lead 82. Another wire 83 completes this circuit. The energization of relay 81 closes a circuit comprising the poles 84, 81 and 85 and the primary 86 of a transformer 87 which converts the current to the potential required for the reciprocating motor 52, which starts the operation of the motor, feeding material from the pressure equalizing hopper 44 over the vibrating trough 43 into a package 88 standing on the load receiver 10 of the weighing scale. The pendulum 25 of the weighing scale normally is in a raised position with the character 89 on the indicator 28 in registry with the indicium 33. The counterbalance weight 90 which serves to predetermine the amount of the material when placed on the platter 11 through the lever system depresses the pendulum so that the indicator comes to rest at the left end of the chart 32. The material being fed by the vibrating trough to the package on the other scale platter slowly raises the pendulum until the edge of the flag-like projection 41 covers the aperture 36. This prevents lamp 38 from illuminating the photo-electric element 34 by eclipsing the aperture 36, thus increasing its resistance and decreasing the amount of the current flowing through the coil of the relay 68, allowing the switch blade 91 to engage the contact 92, thereby closing a circuit through the lead 93 energizing the coil of the relay 94. Actuation of the relay 94 bridges the gap between poles 95 and 96 which are parallel with contact 80 and lead 97. When the bridge contacts 96 and 95 are closed, current will flow through the lead 98 to the contact 99 to the release coil 100 of the mechanically latched electric reset relay 76, thus opening circuits comprising the leads 93, 82, 93 and 101, de-energizing the relay 78 and again throwing the resistance 79 into the circuit. This decreases the amplitude of the vibrations of the armature 54 of the reciprocating motor 52 and consequently the vibration transmitted to the trough 43, which feeds the material falling from the pressure equalizing hopper 44. The decrease in the amplitude of the vibrations reduces the flow of the commodity to a dribble stream.

Under the influence of the load which augmented by the dribble stream continues to accumulate slowly on the commodity receiver, the flag-like extension 41 of the indicator 28 swings with reduced speed over the aperture 36 until the aperture is again uncovered and light is again admitted from the lamp 38 to the photo-electric element. The resulting increase in current passed by the photo-electric element, amplified by the thermionic tube, again energizes the actuating coil of the relay 68, disengaging the blade 91 from the contact 92, thereby de-energizing the actuating coils of the relays 94 and 81 so that the reciprocating motion of the motor 52 is instantly stopped. There is no perceptible lag between the re-entrance of light through the aperture and the stoppage of flow of material. The material in the trough instantly damps out all vibration.

Removal of the package 88 from the commodity receiver causes the indicator hand and the flag-like extension to recede to the position in which they are shown in Figure I at the extreme left hand side of the chart and the circuits to revert to the condition in which they were just previous to the pressing of the starter button 73. The apparatus, therefore, is ready for another filling operation.

The amplitude of the vibrations and thus the speed with which the material is fed may be regulated by manual adjustment of the rheostats 79 and 102. The rheostat 102 controls the high amplitude or the "fast feed" while the rheostat 79 controls the dribble stream.

The embodiment of my invention herein shown and described is to be regarded as illustrative only and it is to be understood that the invention is susceptible to variation, modification and change within the spirit and scope of the subjoined claims.

Having described my invention, I claim:

1. In a device of the class described, in combination, weighing mechanism, a photo-electric element in operative relation thereto, vibratory feeding means controlled by said element, said vibratory feeding means comprising an elongated conduit adapted to feed material at a high rate and a low rate of speed, a shield stationed before said photo-electric element said shield having an aperture, a light source stationed in front of said aperture and adapted to illuminate said proto-electric element and a movable member having substantial width, said movable member being actuated by said weighing mechanism to successively cover and uncover said aperture during operation of said weighing mechanism and thereby cause said vibrating feeding means to cease feeding material at a high rate and then to cease feeding material at a low rate of speed.

2. In a device of the class described, in combination, weighing mechanism and vibrating material feeding means comprising an elongated conduit in cooperative relation thereto, said weighing mechanism comprising a load receiver, load counterbalancing mechanism, an indicating member controlled by said load counterbalancing mechanism, photo-electric means in controlling relation to said vibrating material feeding means, said photo-electric means comprising a light sensitive element, a casing for said element, having an aperture therein, said indicating member covering said aperture in said casing when a predetermined amount of material has been delivered by said vibrating feeding means on said load receiver, whereby the amplitude of vibration of said vibrating feeding means is reduced, and said indicating member subsequently uncovering said aperture when such material on said load receiver reaches a second predetermined amount whereby the vibrations of said feeding means are stopped.

MARK A. WECKERLY.